(12) United States Patent
Proot et al.

(10) Patent No.: US 10,811,906 B2
(45) Date of Patent: Oct. 20, 2020

(54) ADAPTATION OF AN ELECTROMAGNETIC RECHARGING

(71) Applicant: STMICROELECTRONICS (TOURS) SAS, Tours (FR)

(72) Inventors: Jean Pierre Proot, Saint Cyr sur Loire (FR); Pascal Paillet, Saint Cyr sur Loire (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 229 days.

(21) Appl. No.: 15/925,356

(22) Filed: Mar. 19, 2018

(65) Prior Publication Data

US 2018/0331577 A1 Nov. 15, 2018

(30) Foreign Application Priority Data

May 11, 2017 (FR) ..................................... 17 54146

(51) Int. Cl.
| | |
|---|---|
| *H02J 50/12* | (2016.01) |
| *H02J 50/80* | (2016.01) |
| *H04B 5/00* | (2006.01) |
| *H02J 50/70* | (2016.01) |
| *H02J 7/02* | (2016.01) |
| *H02M 7/48* | (2007.01) |

(52) U.S. Cl.
CPC .............. *H02J 50/12* (2016.02); *H02J 7/025* (2013.01); *H02J 50/70* (2016.02); *H02J 50/80* (2016.02); *H04B 5/0037* (2013.01); *H02M 2007/4815* (2013.01)

(58) Field of Classification Search
CPC .. H02J 50/80; H02J 7/025; H02J 50/70; H02J 50/12; H02M 2007/4815; H04B 5/003
See application file for complete search history.

(56) References Cited

U.S. PATENT DOCUMENTS

| | | | |
|---|---|---|---|
| 2009/0002175 A1* | 1/2009 | Waters | G06K 19/0723 340/572.5 |
| 2013/0342024 A1* | 12/2013 | Byun | H04B 5/0037 307/104 |
| 2014/0153351 A1* | 6/2014 | Sforzin | G11C 5/141 365/226 |
| 2014/0225439 A1 | 8/2014 | Mao | |
| 2015/0244179 A1* | 8/2015 | Ritter | H02J 50/90 307/104 |

(Continued)

FOREIGN PATENT DOCUMENTS

| | | |
|---|---|---|
| WO | 2015127127 A1 | 8/2015 |
| WO | 2017205371 A1 | 11/2017 |

*Primary Examiner* — Alfonso Perez Borroto
*Assistant Examiner* — Esayas G Yeshaw
(74) *Attorney, Agent, or Firm* — Slater Matsil, LLP

(57) ABSTRACT

A resonant circuit can be used in recharging a battery. The resonant circuit includes an inductor, a first capacitor in series with the inductor, and a second capacitor in parallel with the inductor. Upon entering the field of a charging terminal a controller connected to the resonant circuit continually measures loss in the inductor and voltage on a terminal of the resonant circuit. If both are below respective predetermined thresholds, the controller decreases the capacitance of the first capacitor and increases the capacitance of the second capacitor, thereby increasing voltage from the resonant circuit to the battery.

20 Claims, 2 Drawing Sheets

(56) References Cited

U.S. PATENT DOCUMENTS

2017/0047785 A1* 2/2017 Twelker .................. H02J 50/70
2017/0093168 A1 3/2017 Von Novak, III et al.
2017/0126070 A1* 5/2017 Lee ........................ H02J 50/80
2017/0133880 A1* 5/2017 Wakisaka ................ H02J 7/025
2019/0006886 A1* 1/2019 Bando .................... H02J 50/90

* cited by examiner

ADAPTATION OF AN ELECTROMAGNETIC RECHARGING

CROSS-REFERENCE TO RELATED APPLICATIONS

This application claims priority to French Application No. 1754146, filed on May 11, 2017, which application is hereby incorporated herein by reference.

TECHNICAL FIELD

The present description relates in general to electronic devices and, more particularly, electromagnetic recharging.

BACKGROUND

Systems which are remotely powered or are rechargeable with no electrical connection have become increasingly common, in particular, since the development of Near Field Communication (NFC) technologies and also portable devices which are rechargeable by means of electromagnetic resonant coupling.

These systems use the energy produced by a radiofrequency electromagnetic field of a terminal to power the electronic circuits of the device and/or recharge a battery which this device contains. In some applications, the terminal also exchanges information with the device by modulating the radiofrequency signal.

In order to protect the electronic circuits of the transponder against overvoltages or excessively high powers which its antenna would capture from the terminal, voltage-limiting circuits are normally provided downstream of a high-voltage rectifier bridge. However, this solution per se is not satisfactory.

SUMMARY

The present description relates in general to electronic devices and particular embodiments relate to devices powered or rechargeable by means of electromagnetic coupling. Some embodiments of the present description apply to devices rechargeable by means of proximity coupling.

Embodiments of the invention can overcome all or some of the disadvantages of the known techniques for limiting the power or voltage in an electronic device which uses electromagnetic coupling.

Embodiments propose a solution avoiding the use of voltage-limiting circuits.

Embodiments provide a solution preserving a possible modulation of the electromagnetic signal for communication purposes.

Particular embodiments provide a method for matching the impedance of a resonant circuit that comprises an inductor, a first capacitor in series with the inductor, and a second capacitor in parallel with the inductor. Upon entering the field of a charging terminal a controller connected to the resonant circuit continually measures loss in the inductor and voltage on a terminal of the resonant circuit. If both are below respective predetermined thresholds, the capacitance value of the first capacitor is decreased and the capacitance value of the second capacitor increased.

According to embodiments, the threshold for inductive loss is chosen as a function of the maximum current which the inductive element can withstand.

According to embodiments, the voltage threshold is chosen according to the maximum voltage which circuits connected to the terminals of the resonant circuit can withstand.

According to embodiments, if the inductive loss is above the first threshold and/or the voltage is above the second threshold, the value of the first capacitive element is increased and the value of the second capacitive element is decreased.

According to embodiments, the variation in the value of the capacitive elements fulfils the condition that the sum of their values remains constant.

Particular embodiments provide an electronic device that comprises a battery rechargeable by means of resonant coupling and a resonant circuit that comprises an inductor, a first capacitor in series with the inductor, a second capacitor in parallel with the inductor, and a circuit for controlling the capacitance values of the first and second capacitors to match the impedance of the resonant circuit.

According to embodiments, the control circuit carries out the impedance matching method.

BRIEF DESCRIPTION OF THE DRAWINGS

These characteristics and advantages, along with others, will be explained in detail in the following description of particular embodiments, given in a non-limiting manner in relation to the attached figures, in which.

DETAILED DESCRIPTION OF ILLUSTRATIVE EMBODIMENTS

The same elements have been denoted by the same references in the different figures.

In the interests of clarity, only the steps and elements relevant to the understanding of the embodiments which will be described have been shown and will be explained in detail. In particular, the generation of the electromagnetic field on the terminal side has not been described in detail, the embodiments described being compatible with conventional field generation techniques.

Unless otherwise indicated, when reference is made to two interconnected elements, this means directly connected with no intermediate element other than conductors, and when reference is made to two interlinked elements, this means that these two elements may be directly linked (connected) or linked via one or more other elements.

In the description which follows, when reference is made to the terms "approximately", "around" and "in the region of", this means to within 10%, preferably to within 5%.

Figure 1:
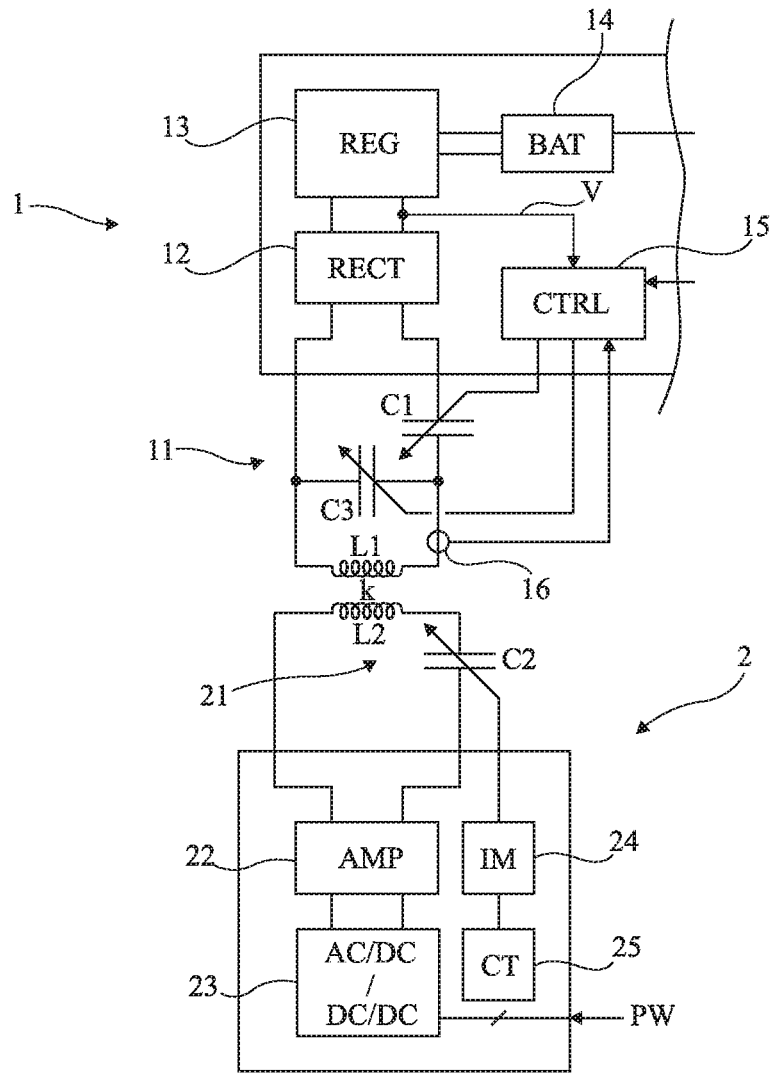
FIG. 1 is a schematic representation, in the form of blocks, of an embodiment of an electronic device rechargeable by means of electromagnetic coupling, and of an example of a recharging terminal.

FIG. 1 is a schematic representation in the form of blocks of an embodiment of an electronic device 1 rechargeable by means of electromagnetic coupling, and of an example of a recharging terminal 2.

The terminal 2 comprises a resonator L2 forming part of an oscillating circuit 21, for example a series circuit. In this example, the resonator L2 is linked in series with a capacitive element C2 between two output terminals of an amplifier 22 (AMP). The amplifier receives, from an energy converter 23 (AC/DC/DC/DC), a high-frequency signal (normally having a frequency between several hundreds of kHz and several tens of MHz) at the resonant frequency of the oscillating circuit 21. The converter 23 receives power PW from an internal source (battery) or an external source (charger connected to the electricity grid). The capacitive element C2 is a variable capacitor whose value allows the impedance of the oscillating circuit 21 to be matched and the resonant frequency to be adjusted. In this case, the value of the capacitive element C2 is controlled from an impedance matching circuit 24 (IM) receiving a control instruction from a control circuit 25 (CT). The terminal 2 may be equipped with other circuits, particularly if it is also used to communicate with the device 1.

The device 1 comprises a resonant circuit 11 which is intended to capture the electromagnetic field generated by the terminal 2. The (two) terminals of the resonant circuit 11 are linked to input terminals of a, preferably full-wave, rectifier circuit 12 (RECT). The output terminals of the rectifier circuit 12 are linked to the input of a voltage regulator 13 (REG), for example a switch-mode power supply regulator or low serial voltage dropout regulator. The regulator 13 supplies the charging energy to a battery 14 (BAT). The energy drawn from the field radiated by the terminal 2 is therefore used to recharge the battery 14 of the device 1.

According to the embodiment shown, the resonant circuit 11 comprises at least one resonator L1 in series with at least one first capacitive element C1 having an adjustable value and also in parallel with at least one second capacitive element C3 having an adjustable value. The elements C1 and C3 are controlled by a circuit 15 (CTRL). The purpose of the circuit 15 is to match the impedance of the resonant circuit 11 in order to optimize the energy recovery. The device 1 comprises other circuits and functions (not shown) which are powered by the battery 14. The circuit 15 can furthermore receive information or instructions from other circuits, for example a microprocessor of the device 1.

It is also provided to adjust the values of the capacitive elements C1 and C3 in order to maximize the energy transfer up to a certain limit so as not to damage the electronic circuits connected to the resonant circuit 11, or the resonant circuit itself.

In fact, according to the distance and the position between the terminal 2 and the device or transponder 1, and for given values of the inductive and capacitive elements, the coupling k varies substantially and the power of the field received by the resonant circuit 11 also varies substantially. This causes significant variations in the voltage developed on the terminals of the resonator L1, and therefore of the resonant circuit 11. This voltage, which may amount to several tens of volts, may exceed the voltage which the electronic circuits of the device 1 are capable of withstanding, which is normally only a few volts, or conversely may be so low that the recovered energy is not sufficient to charge the battery 14.

In order to protect the circuits against overvoltages, conventional solutions use voltage-limiting circuits on the output of the rectifier circuit. However, with these solutions the elements which make up the rectifier bridge 12 and, more generally, all the elements between the resonant circuit 11 and the rectifier 12 need to be capable of withstanding the possible overvoltages on the terminals of the resonator. In particular, the diodes or equivalent elements performing this function need to withstand these overvoltages which may amount to several tens of volts.

Furthermore, an excessively high current in the resonator L1 risks causing damage to it. The circuits examining only the voltage do not protect the resonator against an excessively high current.

The present invention provides a way to modify the tuning of the resonant circuit in order not only to maximize the recovered energy, but also to perform the protection function by limiting the voltage to a given value and the current in the resonator.

To do this, the embodiments of the invention modify the respective values of the series capacitor C1 and the parallel capacitor C3 in order to match the impedance for the purpose of optimizing the energy transfer. For a given coupling condition, optimizing is understood to mean drawing the maximum possible energy from the field while remaining within an acceptable range of voltages for the circuits of the device 1, and with acceptable losses in the resonator.

In order to preserve the resonance, the sum of the respective values of the capacitors C1 and C3 remains constant for a given resonant frequency. With this condition, the more the value of the series capacitor C1 is decreased (and the more the value of the parallel capacitor C3 is increased in order to maintain the condition regarding the sum), the more the current in the inductive element and the voltage at the input of the rectifier bridge, and therefore the recovered energy, are increased.

According to the embodiment shown in FIG. 1, the circuit 15 receives information representing the voltage V recovered at the output of the rectifier 12 and information representing the current in the resonator (the inductor L1). The current in the resonator L1 is, for example, measured by means of a current sensor 16 in the resonant circuit 11. The purpose of the current measurement is to evaluate the losses in the resonator which are sought to be minimized for a given coupling condition.

Figure 2:
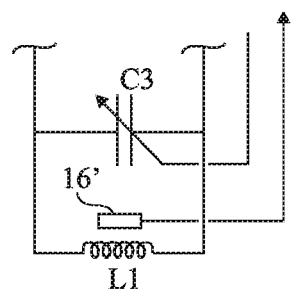
FIG. 2 shows, partially, a variant of FIG. 1.

FIG. 2 shows, partially, a variant of FIG. 1 in which the information relating to the losses in the resonator L1 does not originate from a current measurement, but from a temperature measurement in the resonator. In fact, the losses in the resonator L1 are resistive losses and cause a heating of the receiver which uses the resonator L1. In the example shown in FIG. 2, information representing the temperature of the resonator L1, measured by a temperature sensor 16' placed close to the latter is supplied to the circuit 15.

The choice between a current measurement or temperature measurement depends on the application and the practical conditions linked to the placing of a temperature sensor in the device, close to the resonator.

The adjustment of the values of the capacitors C1 and C3 is preferably carried out continuously. Consequently, a loop processing of the information by the circuit 15 is provided as soon as a field is captured by the resonator.

Figure 3:
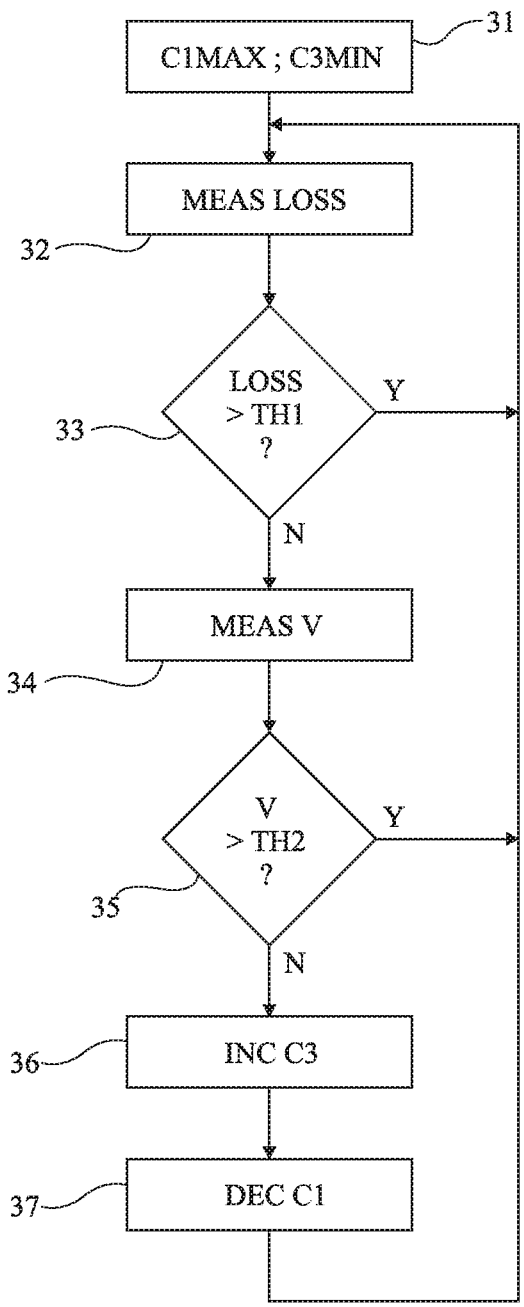
FIG. 3 is a flowchart of an embodiment of a method for regulating capacitive elements of a circuit which matches the resonance of the device shown in FIG. 1.

FIG. 3 is a flowchart of an embodiment of a method for regulating the capacitive elements C1 and C3 of the resonant circuit 11.

The ranges of variation in the values of elements C1 and C3 are chosen when the circuit is designed, inter alia as a function of the inductive value of the resonator, the desired resonant frequency and the maximum expected coupling, and therefore the expected maximum energy (the maximum voltage).

The respective values of the capacitors C1 and C3 are preferably the maximum and minimum at rest (block 31, C1MAX; C3MIN). This guarantees that, when the device 1 enters the field of a terminal, there is no risk of seeing a damaging overvoltage developing on the terminals of the resonant circuit.

As soon as a field is captured, and therefore as soon as a voltage is present at the output of the rectifier 12, a loop process of adjusting the values of the capacitors C1 and C3 is carried out.

The method begins with a measurement (block 32, MEAS LOSS) of the losses in the resonant circuit 11 (i.e., measurement of the current or temperature).

The measurement is then compared (block 33, LOSS>TH1?) with a threshold TH1 of losses which actually corresponds to the maximum current or the maximum temperature in order to avoid damaging the reception device and its resonator.

If these losses are below the threshold TH1 (output N of block 33), the captured energy can be increased.

The voltage V at the output of the rectifier 12 is then measured (block 34, MEAS V) and its value is compared (block 35, V>TH2) with a second threshold TH2 chosen as a function of the maximum voltage which the circuits of the device 1 can withstand.

If the maximum voltage is not reached (output N of block 35), the captured energy can be increased.

The value of the parallel capacitor C3 is then increased (block 36, INC C3) and the value of the series capacitor C1 is decreased (block 37, DEC C1) in order to modify the impedance of the resonant circuit. The adjustment step depends on the application and the chosen capacitive elements C1 and C3.

The method finally returns to the input of block 32 in order to continue to adapt the capacitance values C1 and C3 if necessary.

If the maximum voltage (threshold TH2) is already reached (output Y of block 35), it is not possible to increase the recovered energy without the risk of causing damage to the circuits within the device. The method then returns to the input of block 32 for a following loop.

Similarly, if the losses are already above the threshold TH1 (output Y of block 33), the recovered energy cannot be increased without the risk of causing damage to the resonator L1. The method then returns to the input of block 32 for a following loop.

The embodiment described in relation to FIG. 3 is particularly simple and offers the advantage, subject to a given coupling, of maximizing the recovered energy while simultaneously protecting the resonator and the electronic circuits of the device 1.

According to one embodiment, the capacitors C1 and C3 can be adjusted in both directions, i.e. to be able to increase the value of the series capacitor C1 and decrease the value of the parallel capacitor C3 during energy transfer. This amounts to carrying out this inverse variation if the measured voltage V is above the threshold TH2 (output Y of block 35) and/or if the losses LOSS in the resonator are above the threshold TH1 (output Y of block 33). A variant of this type allows, for example, the circuit to adapt in the event of modification of the coupling conditions during an energy transfer.

According to a another embodiment, instead of starting the impedance matching in relation to the extreme values of the capacitors in block 31 (minimum for C3 and maximum for C1), impedance matching begins in relation to intermediate values in the possible variation range. This variant is more particularly combinable with the preceding variant. However, it is ensured that the matching is not started in conditions where the value of the capacitor C1 is so low that the overvoltage developed on the terminals of the resonator risks exceeding the threshold TH2.

One advantage of the embodiments described is that they allow the energy transfer and therefore the recharging of the battery of the device 1 to be optimized while simultaneously protecting the circuits of the device and the resonator.

Various embodiments have been described. Various modifications will be obvious to the person skilled in the art. In particular, the choice of the value of the thresholds TH1 and TH2 depends on the characteristics of the resonator and on the voltage stability of the components of the device, on the capacity of the receiver to dissipate the heat originating from the resistive losses, etc., and may vary from one application to another. Furthermore, the choice of the variation range of the capacitors C1 and C3 depends, inter alia, on the expected coupling variation and may also vary from one application to another. Furthermore, the practical implementation of the embodiments which have been described is within the scope of the person skilled in the art using the functional information given above and using electronic components which are conventional per se.

What is claimed is:

1. A method for matching the impedance of a resonant circuit, the resonant circuit comprising an inductive element, a first capacitive element in series with the inductive element, and a second capacitive element in parallel with the inductive element, the method comprising:
   measuring loss in the inductive element;
   comparing the loss with a first threshold;
   measuring a voltage on a terminal of the resonant circuit;
   comparing the voltage with a second threshold; and
   when the loss is below the first threshold and the voltage is below the second threshold, decreasing the capacitance of the first capacitive element and increasing the capacitance of the second capacitive element.

2. The method according to claim 1, wherein the first threshold is chosen as a function of a maximum current that the inductive element can withstand.

3. The method according to claim 1, wherein the second threshold is chosen according to a maximum voltage that circuits connected to terminals of the resonant circuit can withstand.

4. The method according to claim 1, further comprising, when the loss is above the first threshold or the voltage is above the second threshold, increasing the capacitance of the first capacitive element and decreasing the capacitance of the second capacitive element.

5. The method according to any one of claim 1, wherein the sum of the capacitance of the first capacitive element and the capacitance of the second capacitive element remains constant.

6. The method according to claim 1, wherein the loss in the inductive element is measured as a function of current.

7. The method according to claim 1, wherein the loss in the inductive element is measured as a function of temperature.

8. The method according to claim 1, wherein when the resonant circuit is at rest, the capacitance of the first capacitive element is set at a maximum value of a first predetermined range and the capacitance of the second capacitive element is set at a minimum value of a second predetermined range.

9. The method according to claim 1, wherein when the resonant circuit is at rest, the capacitance of the first capacitive element is set at a first intermediate value within a first predetermined range, and the capacitance of the second capacitive element is set at a second intermediate value within a second predetermined range.

10. The method according to claim 1, wherein the first threshold is chosen as a function of a maximum current which the inductive element can withstand and the second threshold is chosen according to a maximum voltage which additional circuits connected to the resonant circuit can withstand.

11. An electronic device, comprising:
a rechargeable battery;
a resonant circuit interlinked with the rechargeable battery, the resonant circuit comprising an inductive element, a first capacitive element in series with the inductive element, and a second capacitive element in parallel with the inductive element; and
a control circuit interlinked with the resonant circuit, wherein the control circuit is configured to:
measure loss in the inductive element;
compare the loss with a first threshold;
measure a voltage on a terminal of the resonant circuit;
compare the voltage with a second threshold; and
when the loss is below the first threshold and the voltage is below the second threshold, decrease the capacitance of the first capacitive element and increase the capacitance of the second capacitive element, thereby increasing voltage from the resonant circuit to the rechargeable battery.

12. The device according to claim 11, wherein the first threshold is chosen as a function of a maximum current that the inductive element can withstand.

13. The device according to claim 11, wherein the second threshold is chosen according to a maximum voltage that circuits connected to terminals of the resonant circuit can withstand.

14. The device according to claim 11, wherein the control circuit is further configured to, when the loss is above the first threshold or the voltage is above the second threshold, increase the capacitance of the first capacitive element and decrease the capacitance of the second capacitive element, thereby reducing voltage from the resonant circuit to the rechargeable battery.

15. The device according to claim 11, wherein the sum of the capacitance of the first capacitive element and the capacitance of the second capacitive element remains constant.

16. The device according to claim 11, wherein the resonant circuit further comprises a current sensor connected to the control circuit, wherein the current sensor is configured to measure the loss in the inductive element as a function of current.

17. The device according to claim 11, wherein the resonant circuit further comprises a temperature sensor connected to the control circuit, wherein the temperature sensor is configured to measure the loss in the inductive element as a function of temperature.

18. A resonant circuit, comprising:
an inductor;
a first capacitor in series with the inductor;
a second capacitor in parallel with the inductor;
a control circuit, wherein the control circuit is configured to:
measure loss in the inductor;
measure a voltage on a terminal of the resonant circuit; and
when the loss is below a first predetermined threshold and the voltage is below a second predetermined threshold, decrease the capacitance of the first capacitor and increase the capacitance of the second capacitor.

19. The resonant circuit according to claim 18, wherein the control circuit is further configured to, when the loss is above the first threshold or the voltage is above the second threshold, increase the capacitance of the first capacitor and decrease the capacitance of the second capacitor.

20. The resonant circuit according to claim 18, wherein the sum of the capacitance of the first capacitor and the capacitance of the second capacitor remains constant.

* * * * *